United States Patent [19]
Vegners

[11] 3,749,195
[45] July 31, 1973

[54] HYDROSTATIC DRIVE TRANSMISSION ASSEMBLY

[75] Inventor: Edgar Z. Vegners, Mound, Minn.

[73] Assignee: Eaton Corporation, Cleveland, Ohio

[22] Filed: May 3, 1971

[21] Appl. No.: 139,700

[52] U.S. Cl. .................................. 180/66 F, 418/61
[51] Int. Cl. .............................................. B60k 7/00
[58] Field of Search ............... 180/66 F, 66 R, 43 B, 180/44 E, 44 F; 418/61

[56] References Cited
UNITED STATES PATENTS
2,768,698  10/1956  Fabian ............................... 180/43 B
2,918,982  12/1959  Vlachos ............................ 180/65 R FOREIGN PATENTS OR APPLICATIONS
595,762  12/1947  Great Britain ................... 180/66 R Primary Examiner—Leo Friaglia
Assistant Examiner—John A. Pekar
Attorney—Yount & Tarolli

[57] ABSTRACT

An improved hydrostatic transmission drive assembly for driving a wheel of a vehicle includes a fluid motor having a housing which defines a work chamber enclosing a rotor which drives an output member. A drive means transmits torque from the output member to the wheel of the vehicle and supports the output member for rotational movement about the central axis of the housing. This drive means includes a tubular drive element which circumscribes the housing and is rotatably supported on the housing by a pair of bearing assemblies so that radial loads on the wheel are transmitted to the relatively strong housing by the tubular drive element and bearing assemblies. The tubular drive element is connected with the output member by an end wall and a tubular inner wall which extends into the housing and engages one end of the output member.

12 Claims, 4 Drawing Figures

INVENTOR
EDGAR Z. VEGNERS
BY Yount and Tarolli
ATTORNEYS

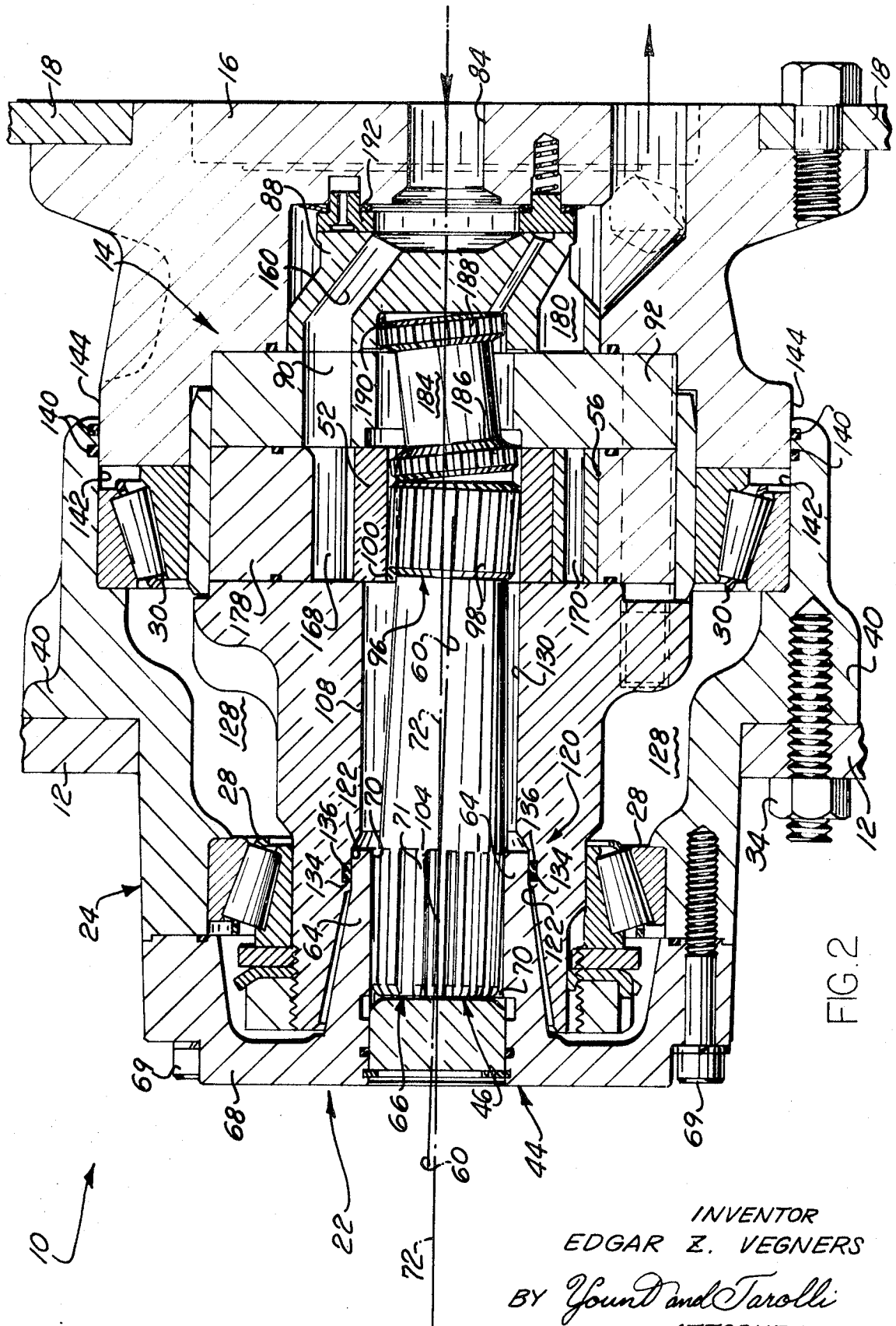

HYDROSTATIC DRIVE TRANSMISSION ASSEMBLY

This invention relates generally to a hydrostatic transmission drive assembly and more specifically to a hydrostatic transmission drive assembly which is mounted on a wheel to be driven.

Hydrostatic transmission assemblies having wheel mounted fluid motors for driving a vehicle are well known. One of the problems encountered with these known wheel drive arrangements is the provision of a compact drive assembly which can withstand the application of relatively large radial loads which are applied to a wheel when a vehicle is fully loaded. If the wheel is mounted directly on the output shaft of a motor, the load which the wheel can support is limited by the bending strength of the output shaft and its support bearings. If the wheel is mounted on a separate vehicle axle, the provision of a compact motor and drive arrangement for the wheel becomes relatively difficult.

The present invention provides an improved hydrostatic transmission drive assembly which is both compact and capable of withstanding relatively large wheel loads. This drive assembly includes a fluid motor having a housing which is fixedly mounted on the outside of the housing by bearing assemblies disposed between the tubular drive element and the housing. Therefore, axial and radial loads are transmitted from the wheel to the relatively strong motor housing by the tubular drive element abd bearing assemblies to minimize the load applied to an output member of the fluid motor. The fluid motor advantageously includes an internal seal arrangement to limit the surface area which is exposed to pressurized fluid from a working chamber in the motor.

Accordingly, it is an object of this invention to provide a new and improved hydrostatic transmission drive assembly for driving the wheel of a vehicle and wherein the drive assembly includes a fluid motor having a housing to which radial or transverse load forces are applied by bearing assemblies which support the wheel for rotation about the central axis of the motor.

Another object of this invention is to provide a new and improved hydrostatic transmission drive assembly for driving a wheel of a vehicle and which includes a fluid motor having an output member disposed in a passage in the housing at an acute angle to the longitudinal axis of the passage and a rotor for rotating the output member about its central axis while simultaneously therewith rotating the output member about the central axis of the passage and wherein a seal assembly is disposed between an inner surface of the passage and a member which supports and is drivingly connected with the output member.

Another object of this invention is to provide a new and improved hydrostatic transmission drive assembly for driving a wheel of a vehicle including a fluid motor having a housing with a work chamber and an output passage therein, an output member disposed in the passage, and a rotor disposed in the work chamber and operatively connected with the output member for rotating the output member about its central axis and wherein a drive connection for transmitting torque from the output member to the wheel includes a tubular drive element which circumscribes the housing and is rotatably supported thereon by bearings which transmit a wheel load to the housing, a tubular inner wall connected to the output member, and an end wall which fixedly interconncts the tubular inner wall and drive element.

These and other objects and features of the present invention will be more apparent upon a consideration of the following description taken in connection with the accompanying drawings wherein:

FIG. 2 is an enlarged sectional view of the hydrostatic transmission drive assembly of FIG. 1 illustrating the relationship between a fluid motor and an assembly for drivingly connecting an output member of the motor to the wheel;

Figure 1:
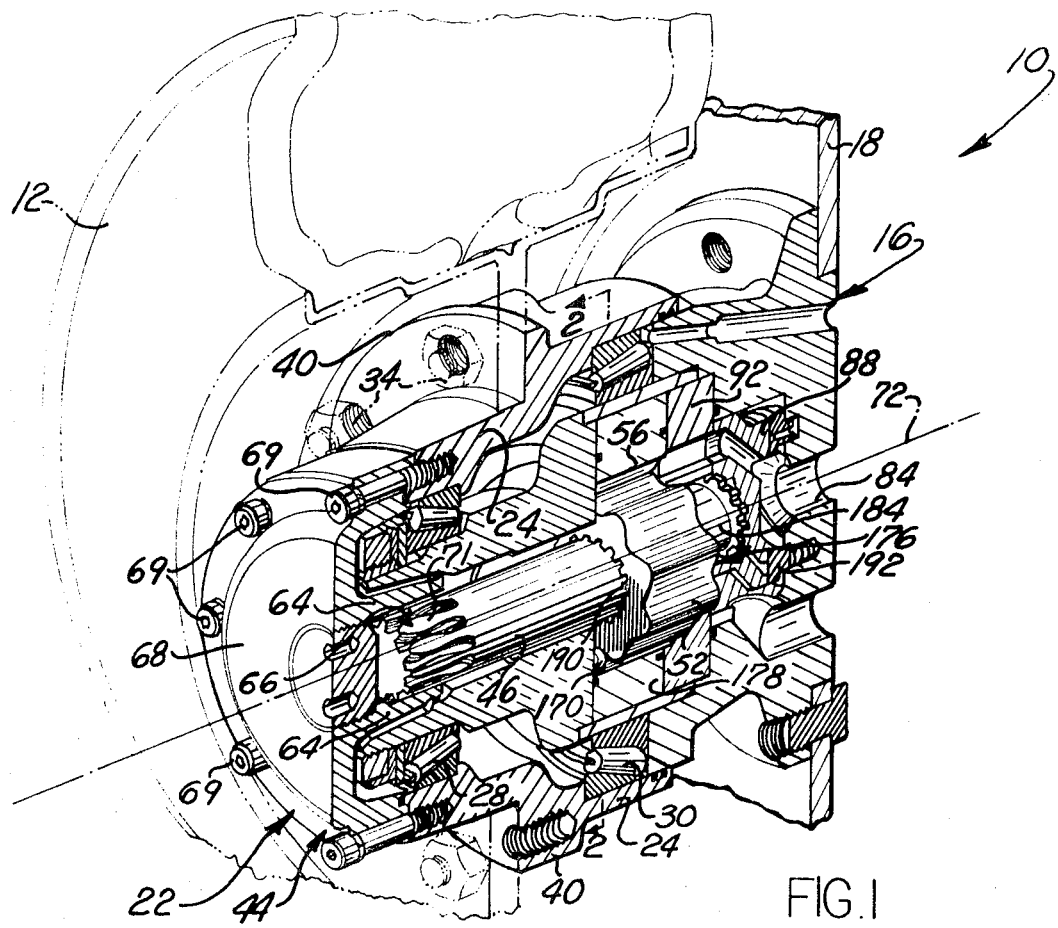
FIG. 1 is a broken-away illustration of a hydrostatic transmission drive assembly constructed in accordance with the present invention, the drive assembly being shown in conjunction with a wheel of a vehicle.

A hydrostatic transmission drive assembly 10 for driving a wheel 12 of a vehicle is illustrated in FIG. 1. The hydrostatic transmission drive assembly 10 includes a fluid motor 14 having a housing 16 which is fixedly connected with a frame member 18 of the vehicle in a coaxial relationship with the wheel 12. A drive assembly 22 transmits torque from the fluid motor 14 to the wheel 12. When the wheel 12 is to be rotated to move the vehicle along a support surface, the fluid motor 14 is driven in a known manner under the influence of high pressure fluid from a pump (not shown) to rotate both the drive assembly 22 and wheel 12 about the central axis of the housing 16.

Torque is transmitted from the fluid motor 14 to the wheel 12 by the drive assembly 22 which includes a tubular exterior wall or drive element 24. The tubular drive element 24 is disposed in a telescopic relationship with the housing 16 and is rotably supported on the housing by bearing assemblies 28 and 30. The bearing assemblies 28 and 30 are tapered roller bearings of a known construction, which are capable of transmitting both radial and axial loads from the wheel 12 and drive element 24 to the housing 16 as the wheel 12 is driven along the ground or other support surface by operation of the fluid motor 14. The tubular exterior wall or drive element 24 is advantageously connected with the wheel 12 by bolts or other suitable connections 34 which engage radially extending mounting flanges 40.

In addition to the tubular drive element 24, the drive assembly 22 includes an end cap or connector assembly 44 which drivingly connects an output shaft or member 46 of the fluid motor 14 with the tubular drive wall 24. The output shaft 46 is rotated about its central axis 60 (FIG. 2) by a rotor 52 in a work chamber 56 to rotate the connector assembly 44 and the tubular drive element 24. To provide for the transmission of torque between the output shaft 46 and tubular drive element 24, the connector assembly 44 includes a tubular inner or connector wall 64 which is disposed in telescopic engagement with a splined end portion 66 of the output shaft. A circular end wall 68 is integrally formed with the tubular inner wall 64 and is fixedly connected with the tubular driveelement 24 by fasteners 69. drive element To provide driving engagement between the circular inner wall 64 and the output shaft 46, the wall has axially extending splines 70 (FIG. 2) which slidably engage splines 71 on the outer end portion 66 of the output shaft 46. The splines 70 and 71 are designed in a known manner to accommodate angular movement of the shaft 46 relative to the wall 64. This enables the shaft 46 to be simultaneously rotated about its central axis 60 and revolved about a central axis 72 (see FIG. 2) of the motor 14 by the rotor 52.

Figure 3:
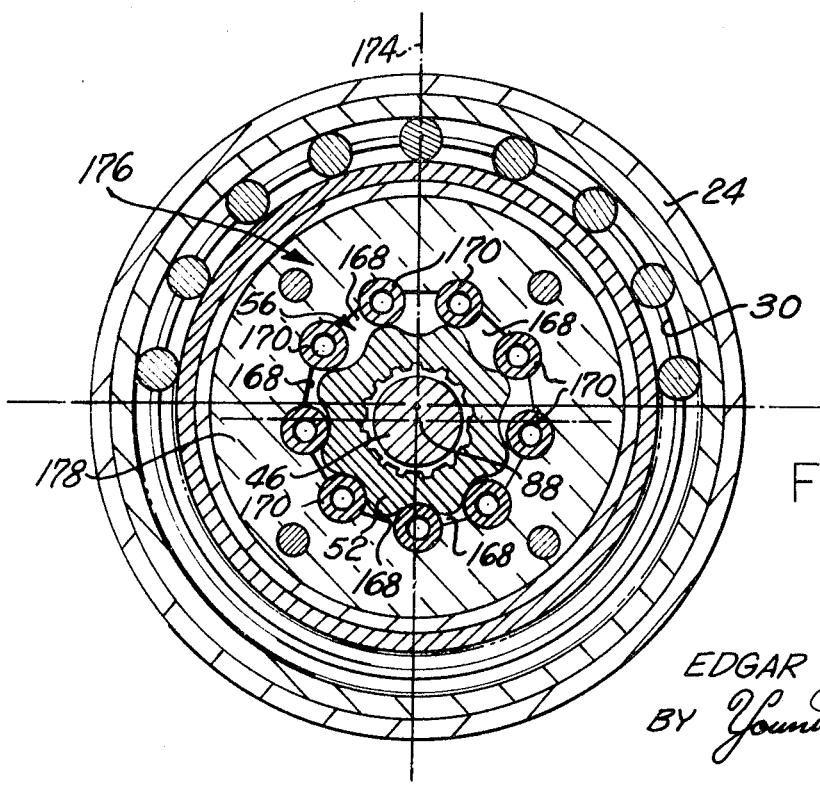
FIG. 3 is a sectional view, taken generally along the line 3—3 of FIG. 2, illustrating a rotor which rotates the output member.

During operation of the motor 14, fluid under pressure is conducted from a pump or other source (not shown) through a passage 84, valve 88 and a plurality of fluid pressure ports 90 (one of which is shown in FIG. 1) in a valve plate 92 to the work chamber 56. The fluid motor 14 is of a known gerotor or roller gerotor type with the rotor 52 eccentrically disposed in the work chamber 56. The rotor 52 rotates about its own axis, indicated at 88 in FIG. 3, while orbiting in the work chamber 56 relative to the central axis 72 of the pump housing 16 and drive assembly 22.

The output shaft 46 includes a spline inner end portion 96 having radially outwardly projecting splines 98 (FIG. 2) which engage inwardly projecting splines 100 on the rotor member 52. The spline inner end portion 96 of the output shaft 46 is rotated about the axis 72 of the pump assembly 14 by the orbiting movement of the rotor 52 in the work chamber 56. The known configuration of the splines 98 and 100 on the inner end portion 96 of the output shaft and the interior of the rotor 52 is such as to accommodate the angular rotational movement of the output shaft 46 about the axis 72.

Rotation of the rotor 52 about its own central axis 88 rotates the output shaft 46 about its central axis 60 and the connector assembly 44 about the motor axis 72 at the same speed. Orbital movement of the rotor 52 about the motor axis 72 also rotates the output shaft 46 about this axis. However, rotation of the output shaft about the axis 72 is ineffective to rotate the connector assembly 44. This is because the output shaft 46 rotates around a center 104 (FIG. 2) located at the intersection of the skewed axes 60 and 72 as it rotates about its central axis 60.

During operation of the motor assembly 14, high pressure fluid from the work chamber 56 flows around the output member 46 into an output passage 108 which is coaxial with the longitudinal axis 72 of the motor assembly 14. This high pressure fluid tends to force the connector assembly 44 axially outwardly away from the housing 16. The axially outward force is resisted by the bearing assembly 28. To minimize the force transmitted to the bearing assembly 28, a high pressure seal assembly 120 is provided between the interior of the passage 108 and an annular external surface 122 of the tubular inner wall 64.

The high pressure seal assembly 120 prevents leakage of fluid from the interior of the motor passage 108 to a bearing cavity 128. If high pressure fluid was allowed to flow from the passage 108 into the bearing cavity 128, the radially extending surface area of the drive assembly 22 exposed to the high pressure fluid would be greatly increased with a resulting increase in the axial load transmitted to the bearing assembly 28. In the absence of the high pressure seal assembly 120, this axial loading on the bearing assembly 28 could exceed 8,000 lbs. with a charge pressure of approximately 250 lbs. per square inch at the inlet passage 84. Thus, by blocking fluid flow between the annular inner wall 64 and the circular inner surface 130 of the passage 108, the high pressure seal assembly 120 substantially reduces the axial load to which the bearing assembly 28 is subjected and thereby increases the operating life of the hydrostatic transmission drive assembly 10.

In one specific embodiment the high pressure seal assembly included a known seal ring 134 of a suitable polymeric material. A back-up washer or ring 136 is mounted in an annular recess in the housing to reinforce the seal ring 134. Of course, other types of seal assemblies capable of withstanding relatively high pressures could be utilized in place of the specific seal assembly 120.

Since the output shaft 46 is revolving about the central axis 72 of the motor 14 as it rotates about its own central axis 60, the provision of a high pressure seal assembly between the exterior surface of the shaft 46 and interior surface 130 of the passage 108 would be relatively difficult. By forming the tubular inner wall 64 with a smooth annular outer surface 122, the provision of the high pressure seal assembly 120 between the passage 108 and the bearing cavity 128 is facilitated. It should be noted that although the tubular inner wall 64 rotates about the central axis 72, it does not rotate about a second axis with a gyrational movement similar to that experienced by the output shaft 46. Therefore, there is a constant clearance between the exterior surface 122 of the tubular inner wall 64 and the interior surface 130 of the passage 108 which facilitates the effective operation of the high pressure seal assembly 120.

A low pressure seal 140 is advantageously provided to retain lubricating fluid or grease in the bearing cavity 128. In addition, the seal 140 prevents dirt from entering the bearing cavity 128. The seal 140 is located between an annular inner surface 142 of the tubular drive element 24 and an annular outer surface 144 of the housing 16.

During operation of the hydrostatic transmission drive assembly 10, rotation forces are transmitted from the pump assembly 14 by the output shaft 46 to the drive assembly 22 in the manner previously explained. These rotational forces are then transmitted by the drive assembly 22 to the wheel 12 to drive the associated vehicle along the ground or other support surface. As the vehicle moves along the ground, radial wheel loads, due to the weight of the vehicle and other factors, are transmitted inwardly by the drive element 24 and bearing assemblies 28 and 30 to the housing 16. Therefore, bending moments and compression loads from the wheel 12 are transmitted by the relatively strong housing 16 to the frame 18 of the vehicle independently of the output shaft 46.

The rugged housing 16 can transmit a relatively large load imposed on the bearing assemblies 28 and 30 by the wheel 12 without deflecting or otherwise interfering with operation of the motor assembly 14. If a relatively large load or bending moment was transmitted directly to the output shaft 46, the relatively small diameter shaft would break or deflect excessively with a resulting malfunctioning of the motor 14. However, since the transverse or radial loads are carried by the housing 16, the output shaft 46 is merely subjected to torque loading by the wheel 12 to thereby minimize the load imposed on the operating components of the fluid motor 14.

While fluid motors similar to the motor 14 are well known, it should be understood that during operation of the motor 14 fluid under pressure enters the inlet 84. This high pressure fluid flows through the passage 160 in the valve 88 and passage 90 in the valve plate 92 to expandable and contractable chambers or cells 168 on one side of center line 174 (FIG. 3) of a displacement mechanism 176. The displacement mechanism 176 includes the rotor 52 and a plurality of rollers 170 mounted on the ring or housing member 178. The cells 168 expand in a known manner and simultaneously urge the rotor to rotate about its axis 88 and to orbit about the motor axis 72. Fluid is exhausted from the cells 168 through passages 180 in the valve 88.

As the rotor 52 rotates, the valve member 88 is driven in a known manner by a valve drive member 184 having splines 186 which mate with the internal splines 100 in the rotor 52 and splines 188 which mate with internal splines 190 in the valve 88. This causes the valve 88 to rotate in synchronism with the rotor or star gear 52 about the central axis 72 of the motor assembly. Of course, the direction of rotation of the rotor 52 and output shaft 46 can be reversed by reversing the direction in which the fluid flows through the valve member 88. A tight seal is provided between the valve member 88 and the housing 16 by a valve-seating ring 192.

The operation of a gerotor or roller gerotor-type motor constructed in the same manner as the motor 14 is fully described in U.S. Pat. No. 3,572,983 to McDermott. The disclosure in that patent should be considered as being fully incorporated herein by this reference thereto.

Figure 4:
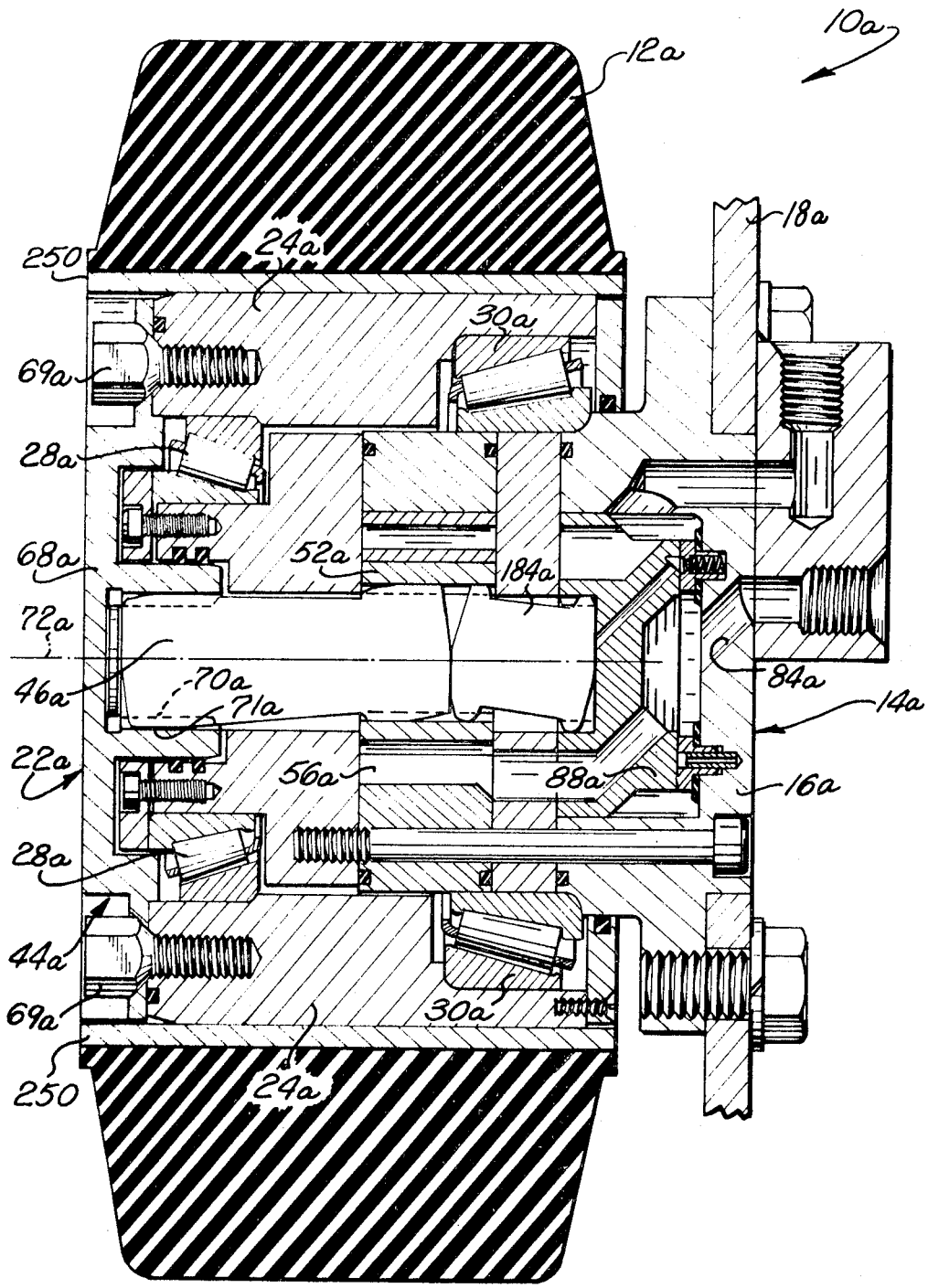
FIG. 4 is a sectional view of a second embodiment of the hydrostatic transmission drive assembly.

Although the hydrostatic transmission drive assembly 10 has been illustrated in FIG. 1 in association with a specific type of vehicle wheel 12, it is contemplated that the hydrostatic transmission drive assembly 10 could be utilized with other types of wheels such as those provided on forklift trucks. Such an embodiment of the hydrostatic transmission drive assembly is illustrated in FIG. 4. Since the embodiments of the invention illustrated in FIGS. 1 and 4 are generally similar in their construction and mode of operation, like parts have been designated with like numerals, the suffix letter (a) being utilized in association with the components of the embodiment of the invention illustrated in FIG. 4 to avoid confusion.

A fork lift truck wheel 12a is shown in FIG. 4 in association with a hydrostatic transmission drive assembly 10a. The hydrostatic transmission drive assembly 10a includes a fluid motor 14a having a housing 16a which is bolted to a support member 18a. A drive assembly 22a transmits torque from the fluid motor 14a to the wheel 12a.

The drive assembly 22a includes a tubular exterior drive wall or element 24a which is rotatably supported on the housing 16a by bearing assemblies 28a and 30a. The bearing assemblies 28a and 30a are capable of transmitting both radial and axial loads from the wheel 12a and drive element 24a to the housing 16a as the wheel 12a is driven along the ground or other support surface by operation of the fluid motor 14a.

In addition to the drive element 24a, the drive assembly 22a includes a connector assembly 44a which drivingly connects an output shaft or member 46a of the fluid motor 14a with the tubular drive element 24a. The connector assembly 44a includes a tubular inner or connector wall 64a having a splined connection with an outer end portion of the output shaft 46a. The tubular inner wall 64a is integrally formed with an end wall 68a which is connected with the tubular drive element 24a by bolts 69a.

During operation of the fluid motor 14a, fluid under pressure is conducted from a pump through a passage 84a and valve 88a to a work chamber 56a in which a rotor 52a is disposed. The rotor 52a is rotated about its central axis while being rotated about the central axis of the rotor assembly 14a in the same manner in which the rotor 52 (FIG. 2) is rotated about its central axis 60 while being rotated about the central axis 72 of the motor 14. Therefore, the shaft 46a is rotated about both its own axis and about the central axis of the motor 14a. However, only the rotation of the output member 46a about its own axis is transmitted by splines 70a and 71a to the drive assembly 22a.

It should be noted that the hydrostatic transmission drive assembly 10a differs from the hydrostatic transmission drive assembly 10 in that it is somewhat more compact with a rim 250 of the wheel 12a being mounted directly on the outer surface of the tubular drive element 24a. In addition, the axial extent of the hydrostatic transmission drive assembly 10a is somewhat less than the axial extent of the hydrostatic transmission drive assembly 10 so that it can fit compactly within the wheel 12a. Of course, the hydrostatic transmission drive assembly 10a could be extended if desired. In fact in one embodiment of the invention the bearing assemblies 28 and 30 (FIG. 2) were mounted outwardly of the work chamber 56.

In view of the foregoing description, it is believed that it will be apparent that the transmission drive assembly 10a is constructed in the same manner as is the transmission drive assembly 10 and functions to drive the wheel 12a in the same manner in which the wheel 12 is driven by the hydrostatic transmission drive assembly 10. In view of this similarity of both construction and operation, further description of the hydrostatic transmission drive assembly 10a will not be included herein to avoid prolixity of description.

Having described specific preferred embodiments of the invention, the following is claimed:

1. A hydrostatic transmission drive assembly for driving a wheel of a vehicle, said drive assembly comprising a fluid motor including a housing defining a work chamber, a rotatable output member, means in said work chamber for rotating said output member relative to said housing, and drive means for transmitting torque from said output member to the wheel, said drive means including a tubular drive element operatively connected with the wheel and rotatable about a central axis of said housing, said tubular drive element circumscribing at least a portion of said housing and cooperating therewith to define a bearing cavity, bearing means disposed in said bearing cavity between an outer surface of said housing and an inner surface of said tubular drive element for supporting said tubular drive element for rotation relative to said housing and for transmitting a load between the tubular drive element and said housing in a direction transverse to the central axis of said housing, and connector means for drivingly connecting said output member with said tubular drive element to rotate said tubular drive element and wheel at a rate which is a function of the rate of rotation of said output member, said connector means including a tubular wall disposed in a coaxial relationship with said tubular drive element and engaging an end portion of said output member, an end wall connected to and extending radially outwardly from said tubular wall, and means for fixedly connecting said end wall with said tubular drive element, said drive assembly further including first seal means disposed between said tubular wall and said housing for blocking fluid communication between said work chamber and said bearing cavity and second seal means disposed between the inner surface of said tubular drive element and the outer surface of said housing for retaining lubricating fluid in the bearing cavity.

2. A hydrostatic transmission drive assembly for driving a wheel of a vehicle, said drive assembly comprising a fluid motor including a housing defining a work chamber, a rotatable output member, means in said work chamber for rotating said output member relative to said housing, and drive means for transmitting torque from said output member to the wheel, said drive means including a tubular drive element operatively connected with the wheel and rotatable about a central axis of said housing, said tubular drive element circumscribing at least a portion of said housing, bearing means disposed between an outer surface of said housing and an inner surface of said tubular drive element for supporting said tubular drive element for rotation relative to said housing and for transmitting, a load between the tubular drive element and said housing in a direction transverse to the central axis of said housing said bearing means including an annular bearing assembly which circumscribes said housing at a location generally radially outwardly of said work chamber, and connector means for drivingly connecting said output member with said tubular drive element to rotate said tubular drive element and wheel at a rate which is a function of the rate of rotation of said output member, said connector means including a tubular wall disposed in a coaxial relationship with said tubular drive element and engaging an end portion of said output member, an end wall connected to and extending radially outwardly from said tubular wall, and means for fixedly connecting said end wall with said tubular drive element.

3. A hydrostatic transmission drive assembly as set forth in claim 2 wherein said tubular drive element and housing cooperate to define a bearing cavity containing said bearing means, said drive assembly further including first seal means disposed between said tubular wall and said housing for blocking fluid communication between said work chamber and said bearing cavity and second seal means disposed between the inner surface of said tubular drive element and the outer surface of said housing for retaining lubricating fluid in the bearing cavity.

4. A hydrostatic transmission drive assembly as set forth in claim 2 wherein said tubular wall extends into said housing and circumscribes an end portion of said output member.

5. A hydrostatic transmission drive assembly as set forth in claim 2 wherein said end wall and tubular drive element cooperate to encase an end portion of said housing.

6. A hydrostatic transmission drive assembly for driving a wheel of a vehicle, said drive assembly comprising a fluid motor including a housing defining a work chamber and an output passage extending therefrom, an output member disposed in said passage with a central axis of said output member extending at an acute angle to a central axis of said passage, and rotor means disposed in said work chamber and operatively connected with said output member for rotating said output member about its central axis while simultaneously therewith rotating said output member about the central axis of said passage, and drive means for transmitting torque from said output member to the wheel and for supporting said output member for rotational movement about the central axis of said passage, said drive means including a tubular drive element rotatable about the central axis of said passage and circumscribing at least a portion of said housing, bearing means disposed between an outer surface of said housing and an inner surface of said tubular drive element for supporting said tubular drive element for rotation relative to said housing about the central axis of said passage and for transmitting a load between the wheel and said housing in a direction transverse to the central axis of said passage, first connector means for supporting said output member for rotational movement relative to said tubular drive element about the central axis of said passage and for drivingly connecting said output member with said tubular drive element to rotate said tubular drive element relative to said housing at a rate which is a function of the rate of rotation of said output member about its central axis, and second connector means for drivingly connecting said tubular drive element with the wheel to effect rotation of the wheel relative to said housing upon rotation of said output member about its central axis.

7. A hydrostatic transmission drive assembly as set forth in claim 6 further including high pressure seal means disposed between an inner surface of said housing and said first connector means and exposed to relatively high pressure fluid from said work chamber for preventing leakage of the relatively high pressure fluid from said passage.

8. A hydrostatic transmission drive assembly as set forth in claim 7 further comprising low pressure seal means disposed between the inner surface of said tubular drive element and the outer surface of said housing for retaining lubricating fluid in a bearing cavity formed between said tubular drive element and said housing.

9. A hydrostatic transmission drive assembly as set forth in claim 6 wherein said first connector means includes a tubular support wall disposed in a coaxial relationship with said passage and said tubular drive element, and means for interconnecting said tubular support wall and said output member.

10. A hydrostatic transmission drive assembly as set forth in claim 9 wherein said tubular support wall extends axially into said passage and is rotatable with said output member about the central axis of said passage, said first connector means further including means connecting said tubular support wall with said tubular drive element for transmitting torque between said tubular drive element and said tubular support wall.

11. A hydrostatic transmission drive assembly as set forth in claim 10 further including seal means disposed between a circular outer surface of said support wall and a circular inner surface of said passage for blocking fluid flow between said support wall and the inner surface of said passage.

12. A hydrostatic transmission drive assembly as set forth in claim 6 wherein said bearing means includes an annular bearing assembly which circumscribes said housing at a location generally radially outwardly of said work chamber.

* * * * *